Dec. 9, 1930. A. P. WOOD 1,784,649

STATOR FOR DYNAMO ELECTRIC MACHINES AND METHOD OF MAKING THE SAME

Filed March 14, 1928

Inventor
Alexander P. Wood,
by Charles E. Tulla
His Attorney.

Patented Dec. 9, 1930

1,784,649

UNITED STATES PATENT OFFICE

ALEXANDER P. WOOD, OF SCHENECTADY, NEW YORK, ASSIGNOR TO GENERAL ELECTRIC COMPANY, A CORPORATION OF NEW YORK

STATOR FOR DYNAMO-ELECTRIC MACHINES AND METHOD OF MAKING THE SAME

Application filed March 14, 1928. Serial No. 261,542.

My invention relates generally to dynamo-electric machines, and particularly to stators therefor and to a method of making the same.

It has been the practice heretofore to construct the stators for dynamo-electric machines, particularly the larger sizes, by providing a cast or fabricated frame structure having machined surfaces on their inner periphery against which the lamination supporting ribs have been secured. These surfaces were arranged at such distance from the axis of the machine that when the ribs were secured thereto and the laminations arranged on the ribs the desired air gap was formed between the stator laminations and the rotor in the completed machine. In order to accurately locate the ribs in the frame it has been necessary to either slot or finish the frame to form a seat for each rib or bore out its inner periphery and attach the ribs thereto. In either case this machine work has been costly as large boring or slotting machines were required.

The object of my invention is to provide an improved stator construction and also carry out a method of making the same which will avoid the necessity of doing any machine work on the stator frame in mounting the laminations therein. I accomplish this by providing a construction in which the lamination supporting ribs are spaced from the frame so that it is unnecessary to machine surfaces to locate them accurately with respect thereto. In order to locate these ribs in the stator frame I construct this stator in the following manner: First I arrange a rib in spaced relation to the frame of the machine in such position that the laminations supported thereon will form the desired air gap in the completed machine, and then weld or otherwise attach the rib in this position to the frame.

My invention will be more fully set forth in the following description referring to the accompanying drawing, and the features of novelty which characterize my invention will be pointed out with particularity in the claims annexed to and forming a part of this specification.

Figure 1:
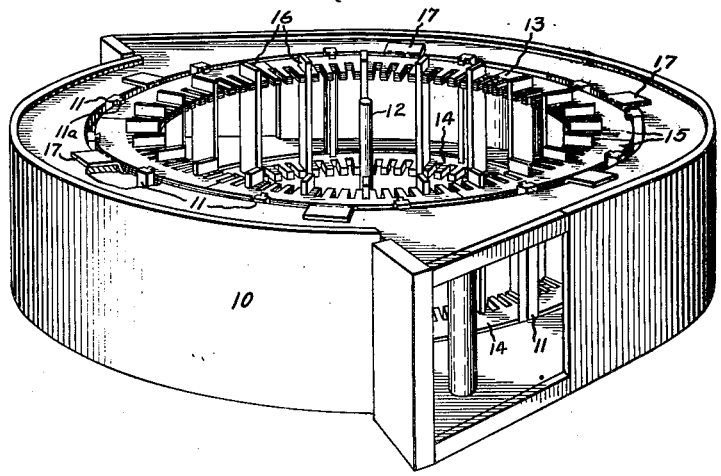
Figure 2:
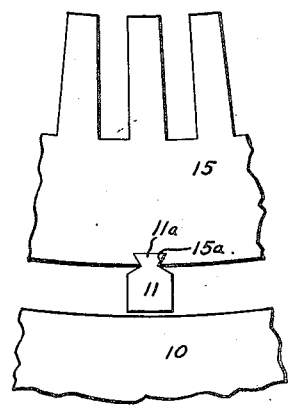
Figure 3:
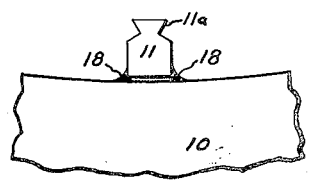

In the drawing, Fig. 1 is a perspective view of a stator being made in accordance with my improved method; Fig. 2 is a fragmentary view of the stator shown in Fig. 1, and Fig. 3 is a view similar to Fig 2 showing the lamination supporting ribs welded in place.

Referring to the drawing, the stator in connection with which I have shown my invention comprises a frame 10 having lamination supporting ribs 11 attached thereto on which the laminations are retained in the completed machine by suitable clamping plates. In accordance with my invention the ribs 11 are spaced from the portions of the frame to which they are secured so as to avoid the necessity of machining these portions in locating the ribs in proper position with respect to the axis of the machine.

In carrying out my improved method, I have found it convenient to place the frame 10 on the floor of the shop where the machine is being built and approximately center a shaft 12, which is supported on the floor, with respect to the axis of the frame. In order to avoid the necessity of machining the frame, the lamination supporting ribs 11, which I prefer to make of rolled stock having dovetails 11a formed thereon, are then arranged about the inner periphery of the frame 10 in spaced relation thereto, as shown in Fig. 2, and in such relation to the shaft 12 that when the laminations are arranged on the dovetails 11a they will form the desired air gap in the completed machine. These lamination supporting ribs may be arranged in this relation to the frame either singly or in groups by the use of suitable templates, or in any other convenient manner, but I prefer to place them in this relation by arranging the ribs about the inner periphery of the frame and stacking bundles 13 and 14 of a small number of toothed lamination sectors 15 at the ends of the frame. The sectors 15 are formed with dovetailed notches 15a, which are adapted to fit on the dovetail portions 11a of the ribs 11, and the bundles 13 and 14 are stacked with the notches 15a engaging the dovetails 11a and the teeth engaging plates 16 which align the teeth of the sectors with each other. The bundle 14 of laminations is supported on the floor by blocks (not shown), and the bundle 13 of laminations is supported on step-shaped plates 17 secured on the end of the frame 10. After the laminations and ribs are arranged in the frame in this manner they are then centered with respect to the axis of the stator by a suitable pin gage which is placed between the ends of the lamination teeth and the shaft 12. The pin gage is placed in this position on several radii of the stator, and the laminations and ribs are moved radially away from or toward the shaft 12 until the teeth of the laminations contact with the end of the pin gage. This will result in the ribs 11 being spaced from the frame 10 as shown in Fig. 2, and they are then welded in this position to each of the portions of the frame 10 adjacent thereto, as indicated at 18 in Fig. 3. After the ribs are welded to the frame, the bundles of laminations 13 and 14 are removed from the ribs and the laminations can be stacked in the frame in the usual manner. It is apparent, however, that instead of using bundles of laminations 13 and 14, all of the laminations that are to be used in the machine can be stacked in the frame on the ribs 11 and bars 16 and centered therein by means of a pin gage in the manner described above. In constructing the stator in this way, after the bars 11 are welded to the frame, it will only be necessary to remove the plates 16 and clamp the laminations in the machine between the clamping plates in the usual manner.

In view of the foregoing it will be clear that I have provided an improved stator construction for dynamo-electric machine and a method of constructing the same which entirely avoids the necessity of machining any portions of the frame to center the lamination supporting ribs therein.

What I claim as new and desire to secure by Letters Patent of the United States, is:—

1. The method of making a stator for dynamo-electric machines, comprising providing a frame, arranging lamination supporting bars in spaced relation to said frame, placing laminations on said bars so that the same are in such position that the laminations supported thereon will be at such radial distance from the axis of the stator as to form the desired air gap in the completed machine, and then welding said bars in this position to said frame.

2. The method of making a stator for dynamo-electric machines, comprising providing a frame, arranging laminations and supporting bars in engagement therewith with the bars in spaced relation to said frame of the machine in such position that the laminations supported thereon are at such radial distance from the axis of the stator as to form the desired air gap in the completed machine, and then attaching the bars in this position to said frame.

In witness whereof, I have hereto set my hand this 13th day of March, 1928.

ALEXANDER P. WOOD.